United States Patent
Zhao et al.

(10) Patent No.: US 9,604,336 B2
(45) Date of Patent: Mar. 28, 2017

(54) BELT TRANSMISSION DEVICE AND GRINDING APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yinchu Zhao, Beijing (CN); Haibin Liu, Beijing (CN); Jinjun Wang, Beijing (CN); Xu Li, Beijing (CN); Zuoxiang He, Beijing (CN); Xinqing Zhu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/801,756

(22) Filed: Jul. 16, 2015

(65) Prior Publication Data

US 2016/0151877 A1  Jun. 2, 2016

(30) Foreign Application Priority Data

Nov. 27, 2014 (CN) .......................... 2014 1 0698149

(51) Int. Cl.
*B24B 21/20* (2006.01)
*B24B 21/00* (2006.01)
(Continued)

(52) U.S. Cl.
CPC ............ *B24B 21/20* (2013.01); *B24B 21/006* (2013.01); *B24B 49/006* (2013.01); *B24B 49/105* (2013.01); *G02F 1/1303* (2013.01)

(58) Field of Classification Search
CPC ....... B24B 21/00; B24B 21/006; B24B 21/20; B24B 49/006; B24B 49/105; B24B 49/16; B65G 43/04; G02F 1/1303
See application file for complete search history.

(56) References Cited

U.S. PATENT DOCUMENTS 2,472,526 A * 6/1949 Frazee ................... B65G 43/04
                                                   198/810.01
3,845,375 A * 10/1974 Stiebel ................... B23K 11/10
                                                   198/502.4
(Continued)

FOREIGN PATENT DOCUMENTS

CN       201261220 Y       6/2009
CN       101657694 A       2/2010
(Continued)

OTHER PUBLICATIONS

First Chinese Office Action including English translation dated Mar. 28, 2016 for corresponding Chinese Application No. 201410698149.1.
(Continued)

*Primary Examiner* — Timothy V Eley
(74) *Attorney, Agent, or Firm* — Kinney & Lange, P.A.

(57) ABSTRACT

The present disclosure provides a belt transmission device and a grinding apparatus. The device comprises: a grinding stand; rotation wheels mounted on the grinding stand, including a driver wheel and driven wheels; a grinding belt supported by rotation wheels; a first sensor fixedly provided on the grinding stand and configured to detect a rotation speed of any one of the driven wheels; and a controller configured to control a rotation speed of the driver wheel and connected with a driving motor of the driver wheel, wherein the controller is further connected with the first sensor, receives rotation speed signals of the one driven wheel detected by the first sensor, calculates difference between the
(Continued)

rotation speeds of the driver wheel and the one driven wheel, and compares the difference with a predetermined difference range in the controller; and when the difference is beyond the predetermined difference range, an alarm is provided.

20 Claims, 4 Drawing Sheets

(51) Int. Cl.
*B24B 49/10* (2006.01)
*B24B 49/00* (2012.01)
*G02F 1/13* (2006.01)

(56) References Cited

U.S. PATENT DOCUMENTS

| | | | | |
|---|---|---|---|---|
| 3,989,989 A | * | 11/1976 | Mayer | G01P 3/56 198/502.4 |
| 4,135,082 A | * | 1/1979 | Borders, Jr. | G01P 3/489 235/103.5 R |
| 5,399,125 A | | 3/1995 | Dozier | |
| 5,954,186 A | * | 9/1999 | Stroobandt | B65G 43/04 198/502.4 |
| 6,746,320 B2 | * | 6/2004 | Krusell | B24B 21/04 451/168 |
| 2010/0212818 A1 | * | 8/2010 | Dohring | B05C 1/14 156/196 |

FOREIGN PATENT DOCUMENTS

| | | |
|---|---|---|
| CN | 102303275 A | 1/2012 |
| CN | 103100951 A | 5/2013 |
| CN | 203141270 U | 8/2013 |
| CN | 103692317 A | 4/2014 |
| CN | 203579365 U | 5/2014 |
| CN | 103831690 A | 6/2014 |
| CN | 203854045 U | 10/2014 |

OTHER PUBLICATIONS

Second Chinese Office Action (including English translation) dated Nov. 7, 2016, for corresponding Chinese Application No. 201410698149.1.

* cited by examiner

BELT TRANSMISSION DEVICE AND GRINDING APPARATUS

CROSS-REFERENCE TO RELATED APPLICATION

This application claims the benefit of Chinese Patent Application No. 201410698149.1 filed on Nov. 27, 2014 in the State Intellectual Property Office of China, the whole disclosure of which is incorporated herein by reference.

BACKGROUND OF THE INVENTION

Field of the Invention

The present disclosure generally relates to the field of apparatus for manufacturing liquid crystal displays, and particularly, to a belt transmission device and a grinding apparatus.

Description of the Related Art

Usually, in a process of manufacturing a thin film transistor liquid crystal display (TFT-LCD), a glass substrate is firstly cleaned and ground, and then thin film transistors are produced on the glass substrate.

In the existing grinding apparatus for a glass substrate, a belt transmission device is used for driving to realize grinding. This belt transmission device generally comprises a grinding stand and four rotation wheels provided at four corners of the grinding stand. The four rotation wheels are used for supporting a grinding belt, provide a tension force to the grinding belt. The four rotation wheels include one driver wheel and three driven wheels. The driver wheel is driven by a driving motor to rotate, which in turn drives the three driven wheels to rotate by means of the grinding belt supported by the rotation wheels. In this way, transmission of the grinding belt is realized finally.

In the existing grinding apparatus for the glass substrate, however, since it is needed to provide a sufficient tension force to the grinding belt and thus the positions of the driver wheel and the three driven wheels are fixed, there is a problem that the grinding belt cannot be mounted and detached easily. Moreover, after the grinding belt has been used for a period of time, its tension force will change, causing the grinding belt to slip on the driver wheel or the driven wheels or even fall off the wheels. In the existing grinding apparatus, there is no device provided for adjusting the tension force of the grinding belt, no device provided for detecting the rotation speed of the grinding belt in real-time, and no device provided for detecting and feeding back slipping and falling-off of the grinding belt. Thus, when the rotation speed of the grinding belt changes, and even when the grinding belt slips on the wheels or falls off from the wheels, an operator cannot deal with these problems in time, so that the apparatus may delay or stop, utilization of the apparatus may be adversely influenced, productivity thereof may be reduced, and product yield of the glass substrate may also be adversely influenced.

SUMMARY OF THE INVENTION

In view of the above, embodiments of the present disclosure provide a belt transmission device and a grinding apparatus comprising the belt transmission device, which are capable of eliminating or at least alleviate part or all of the above-mentioned problems existing in the prior art.

According to one aspect of the present disclosure, there is provided a belt transmission device, comprising: a grinding stand; a plurality of rotation wheels mounted on the grinding stand, including a driver wheel and driven wheels; a grinding belt supported by the plurality of rotation wheels; a first sensor fixedly provided on the grinding stand and configured to detect a rotation speed of any one of the driven wheels; and a controller configured to control a rotation speed of the driver wheel and connected with a driving motor of the driver wheel, wherein the controller is also connected with the first sensor, receives rotation speed signals of the one driven wheel detected by the first sensor, calculates difference between the rotation speed of the driver wheel and the rotation speed of the one driven wheel, and compares the difference with a predetermined difference range in the controller; and when the difference is beyond the predetermined difference range, an alarm is provided.

According to another aspect of the present disclosure, there is provided a grinding apparatus, comprising the above-mentioned belt transmission device.

DETAILED DESCRIPTION OF PREFERRED EMBODIMENTS OF THE INVENTION

Technical solutions according to embodiments of the present invention will be described hereinafter in detail with reference to the attached drawings. Obviously, the described embodiments are only a part of the embodiments of the present disclosure, not all of the embodiments of the present disclosure. Based on the embodiments of the present disclosure, all other embodiments obtained by one skilled in the art without paying any inventive effort fall within the scope of the present invention.

In the description of the present disclosure, it should be noted that terms "mount", "connect" and "attach" have general senses, for example, including "fixedly connected", "detachably connected", "integrally connected", "mechanically connected", "electrically connected", "directly connected", "indirectly connected by means of a medium", or "communication between insides of two elements", unless otherwise stated. One skilled in the art can understand the specific meanings of the above terms in the present invention according to specific cases.

As shown in FIGS. 1-4, the belt transmission device according to the embodiments of the present disclosure comprises: a grinding stand 1; a plurality of rotation wheels mounted on the grinding stand 1, including a driver wheel 2 and driven wheels 3; a grinding belt 4 supported by the plurality of rotation wheels; a first sensor 5 fixedly provided on the grinding stand 1 and configured to detect a rotation speed of any one of the driven wheels 3; a controller (not shown) configured to control a rotation speed of the driver wheel 2 and connected with a driving motor of the driver wheel 2, wherein the controller is also connected with the first sensor 5, receives rotation speed signals of the one driven wheel 3 detected by the first sensor 5, calculates difference between the rotation speed of the driver wheel 2 and the rotation speed of the one driven wheel 3, and compares the difference with a predetermined difference range in the controller; and when the difference is beyond the difference range, an alarm is provided.

With the belt transmission device according to the embodiments of the present disclosure, the first sensor 5, which detects the rotation speed of the driven wheel 3, is provided on the grinding stand 1 and is connected with the controller configured to control the rotation speed of the driver wheel 2, and also feeds back the detected rotation speed signals of the driven wheel 3 to the controller in real time, and the controller calculates difference between the rotation speed of the driver wheel 2 and the rotation speed of the driven wheel 3 and compares the difference with the predetermined difference range in the controller, wherein when the difference is beyond the predetermined difference range, this indicates that the grinding belt 4 slips on the driver wheel 2 or the driven wheels 3, or that the grinding belt 4 may fall off from the driver wheel 2 and/or the driven wheels 3. At this time, the controller sends an alarm signal to warn the operator to deal with the problem in good time. In this way, the belt transmission device according to the embodiments of the present disclosure can solve the problem, existing in the prior art, that abnormal operations caused by slippage or falling-off of the grinding belt 4 cannot be detected, so that delay or stop of the apparatus caused by the slippage or falling-off of the grinding belt 4 can be avoided, and thus utilization and productivity of the apparatus can be improved, and at the same time the product yield of the ground glass substrates can be ensured.

In an embodiment, the first sensor 5 is an eddy current displacement sensor, and a sensing structure, such as a notch 31 (for example, shown in FIG. 3) or a protrusion, is provided on a periphery of a side end face of the one driven wheel 3. The sensing structure is synchronously rotated along with the driven wheel 3 to form a rotation track, and a probe of the eddy current displacement sensor corresponds to a point on the rotation track.

Figure 1:
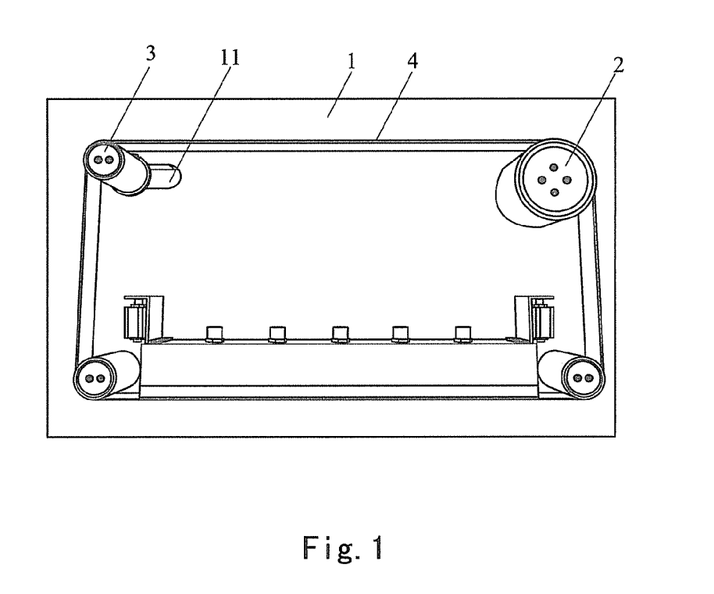
FIG. 1 is a schematic structural view of a belt transmission device according to an embodiment of the present disclosure.
Figure 2:
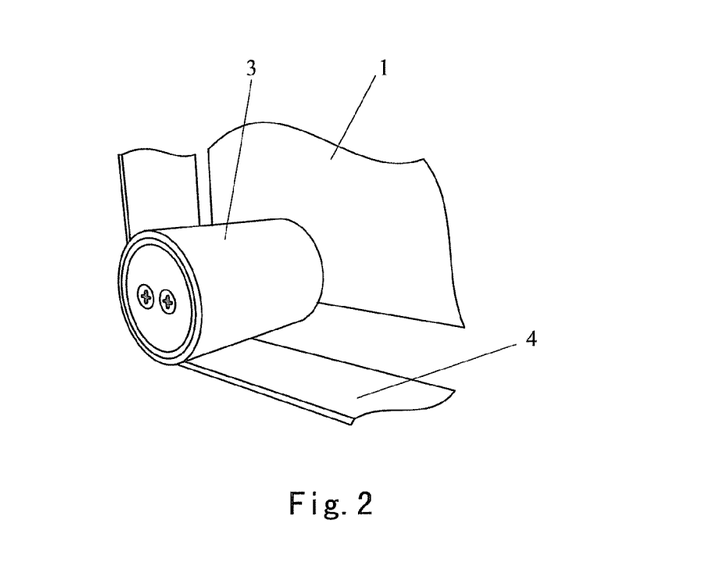
FIG. 2 is a schematic view showing that driven wheels support a grinding belt in the belt transmission device according to an embodiment of the present disclosure.
Figure 3:
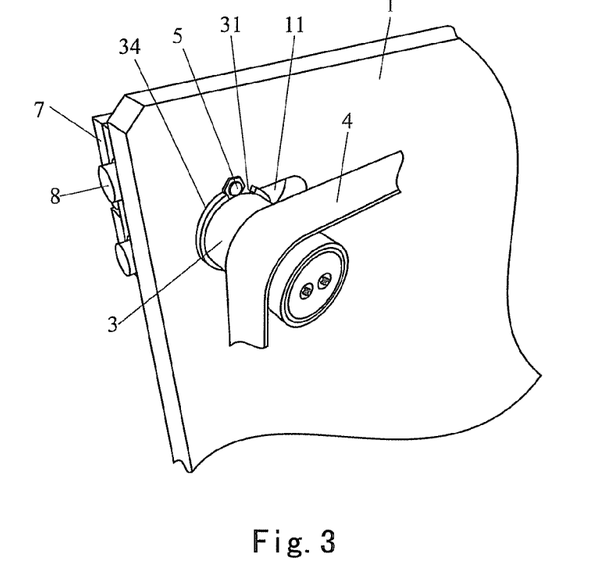
FIG. 3 is a schematic view of a mounting position of a first sensor in the belt transmission device according to an embodiment of the present disclosure.
Figure 4:
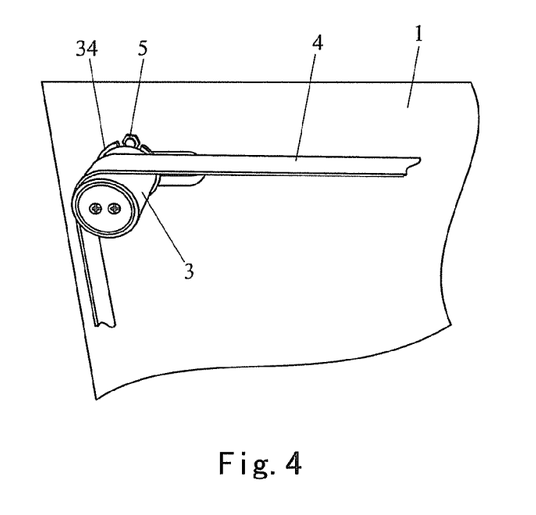
FIG. 4 is a schematic view showing a state in which the first sensor faces a sensing structure in the belt transmission device according to an embodiment of the present disclosure.

Since the probe of the eddy current displacement sensor corresponds to a point on the rotation track of the sensing structure (for example, the notch 31 or the protrusion), each time when the sensing structure is rotated along with the driven wheel 3 by a round (i.e., 360 degrees), the probe of the eddy current displacement sensor meets the sensing structure once. Each time when the probe meets the sensing structure, the distance between the probe and the side end face of the driven wheel 3 varies, and such variation in distance causes variation in oscillation voltage amplitude on an inner coil of the eddy current displacement sensor. The variation in oscillation voltage amplitude which varies as the distance between the probe and the side end face of the driven wheel 3 varies, is converted into the variation in voltage (current) by processes of demodulation, filtering, linear compensation, magnification and normalization, so that conversion of the distance variation into the voltage (current) variation is realized. In this way, rotation speed parameters of the driven wheel 3 can be obtained by recording the number of the variation in voltage (current) in unit time, and the rotation speed of the driven wheel 3 is finally detected by the eddy current displacement sensor.

Figure 5:
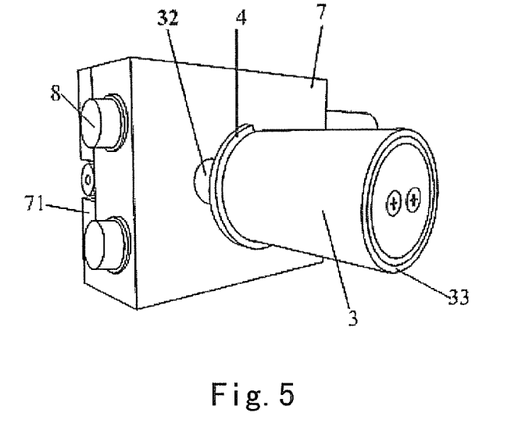
FIG. 5 is a schematic view showing connection of a driven wheel with a sliding block in the belt transmission device according to an embodiment of the present disclosure.

In an embodiment, as shown in FIG. 5, in the belt transmission device according to the embodiments of the present disclosure, the driven wheel 3 at least comprises one rotation roller 33 and a hollow disk 34 fixedly provided at an end of the rotation roller 33. The rotation roller 33 is configured to support the grinding belt 4. The center axis of the hollow disk 34 is coincident with the center axis of the rotation roller 33, and the outer diameter of the hollow disk 34 is greater than the outer diameter of the rotation roller 33. The sensing structure (for example, the notch 31 or the protrusion) is provided on the hollow disk 34.

The outer diameter of the hollow disk 34 is greater than the outer diameter of the rotation roller 33, so that the hollow disk 34 has a greater side surface area than that of the rotation roller 33 and thus the sensing range of the probe of the eddy current displacement sensor on the side face of the driven wheel 3 is increased. In this way, a sensing stability of the probe of the eddy current displacement sensor to the side face of the driven wheel 3 can be improved, so that detection accuracy of the eddy current displacement sensor can be ensured.

In a specific embodiment, the sensing structure is the notch 31 provided at the outer edge of the hollow disk 34. In an alternative specific embodiment, the sensing structure may be the protrusion (not shown) provided on a side face of the hollow disk 34 facing toward the grinding stand 1.

In an embodiment, as shown in FIG. 5, the hollow disk 34 is fixed at the end of the rotation roller 34 facing toward (i.e., near) the grinding stand 1. Since the eddy current displacement sensor is mounted on the grinding stand 1, the distance between the probe of the eddy current displacement sensor and the surface of the hollow disk 34 is small, so as to facilitate improvement on detection accuracy of the eddy current displacement sensor.

It should be noted that in the belt transmission device according to the embodiments of the present disclosure, the operation principle of the eddy current displacement sensor detecting the rotation speed of the driven wheel is that a high frequency oscillation current is generated in a proximitor of the eddy current displacement sensor and flows into a coil of the probe through an extended cable to generate an alternating magnetic field therein. When a metal member to be detected (for example, the hollow disk 34) approaches this magnetic field, an induced current is generated on the surface of the metal member. At the same time, such induced current also generates an alternating magnetic field having a direction opposite to the direction of the coil of the probe. Due to reaction of the alternating magnetic field generated by the induced current, the amplitude and phase of the high frequency oscillation current in the coil of the probe varies. Such variation is related to the variation in distance, that is, each time when the probe meets the sensing structure (such as the notch or the protrusion), the amplitude and phase of the high frequency oscillation current in the coil of the probe varies once, thereby detecting the rotation speed of the driven wheel. Therefore, the hollow disk 34 in the belt transmission device according to the embodiments of the present disclosure should be made of a metal material. If the hollow disk 34 is provided with the protrusion, the protrusion is made of a metal material.

Figure 6:
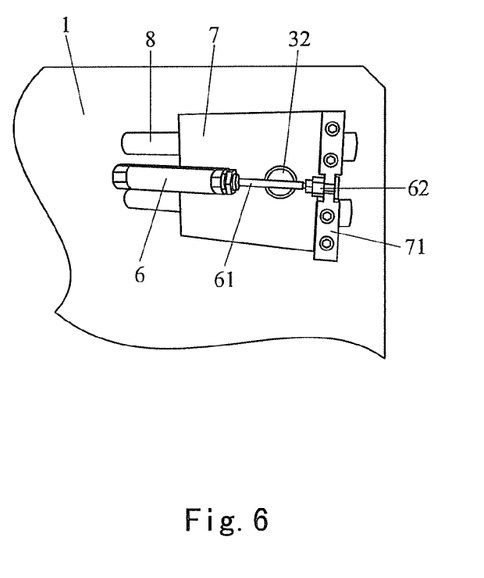
FIG. 6 is a schematic view showing connection of a piston rod of a cylinder with the sliding block in the belt transmission device according to an embodiment of the present disclosure.

In an embodiment, as shown in FIGS. 3-7, in the belt transmission device according to the embodiments of the present disclosure, the grinding stand 1 is provided with an elongated hole 11 having two ends in semi-circular shape. A rotation shaft 32 of one of the plurality of rotation wheels is mounted to the grinding stand 1 by passing through the elongated hole 11. The grinding stand 1 is provided thereon with a guiding member 8 which is provided adjacent to the elongated hole 11 and is provided on the surface of the grinding stand 1 facing away from the plurality of rotation wheels. The guiding member 8 extends in the length direction of the elongated hole 11. The guiding member 8 is connected with a sliding block 7 which can slide on the guiding member 8. The rotation shaft of the one of the plurality of rotation wheels (for example, as shown in FIG. 6, the rotation shaft 32 of the driven wheel 3) passes through the elongate hole 11 and is connected with the sliding block 7.

Figure 7:
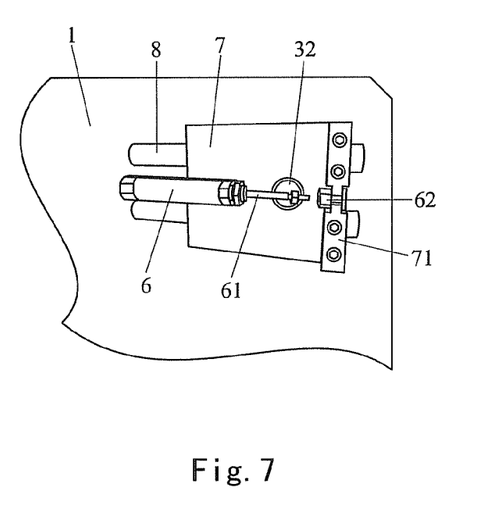
FIG. 7 is schematic view showing a separation state of the piston rod of the cylinder from the sliding block in the belt transmission device according to an embodiment of the present disclosure.

In a further embodiment, as shown in FIGS. 6 and 7, the belt transmission device further comprises a cylinder 6. A cylinder body of the cylinder 6 is fixed with respect to the grinding stand 1. A piston rod 61 of the cylinder 6 is connected with the sliding block 7, and the retracting/stretching direction of the piston rod 61 is parallel to the length direction of the elongated hole 11. The piston rod 61 of the cylinder 6 adjusts the tension force of the grinding belt 4 by pushing the sliding block 7 to slide and in turn pushing the rotation wheel connected with the sliding block 7 to slide along the elongated hole 11.

In this embodiment, the rotation shaft of the rotation wheel passes through the elongated hole 11 and is connected with the sliding block 7. In this way, the sliding block 7 can provide a support for the rotation wheel, and an acting force between the rotation shaft of the rotation wheel and the inner wall of the elongated hole 11 is reduced. Thus, when the piston rod 61 of the cylinder 6 pushes the rotation wheel to move, cooperation between the sliding block 7 and the guiding member 8 provides a guiding function for movement of the rotation wheel, so that the rotation shaft of the rotation wheel can be prevented from being worn and product reliability of the belt transmission device can be advantageously improved. It should be noted that the above-mentioned exemplary rotation wheel may be the driver wheel 2, or may be the driven wheel 3, as long as it can be pushed by the piston rod 61 of the cylinder 6 to adjust the tension force of the grinding belt 4 after passing through the elongated hole 11 and being mounted to the grinding stand 1.

It should be noted that the guiding member 8 may be a guiding rail or a chute. Of course, the guiding member 8 may also be other guiding structures. In an embodiment of the present disclosure, the guiding member 8 is two parallel guiding rails which are slidably connected with the sliding block 7, as shown in FIG. 6. The arrangement of the two parallel guiding rails being slidably connected with the sliding block 7 can prevent the sliding block 7 from rotating on the guiding rails, so that stability of sliding movement of the sliding block 7 along the guiding rails can be improved and support stability of the rotation wheels to the grinding belt 4 can also be improved.

Embodiment 1

Next, the embodiment, in which one driven wheel 3 is pushed by the piston rod 61 of the cylinder 6 to adjust the tension force of the grinding belt 4, is taken as an example to describe adjustment of the tension force of the grinding belt 4 in the belt transmission device according to the above embodiments of the present disclosure.

In the belt transmission device according to this embodiment of the present disclosure, the rotation shaft 32 of the driven wheel 3 passes through the elongated hole 11 and is mounted to the sliding block 7 provided on the grinding stand 1. The piston rod 61 of the cylinder 6 is connected with the sliding block 7. The piston rod 61 of the cylinder 6 pushes the driven wheel 3 to slide along the elongated hole 11 by pushing the sliding block 7 to slide on the guiding member 8, so as to adjust the tension force of the grinding belt 4.

In the belt transmission device according to this embodiment, the piston rod 61 of the cylinder 6 always pushes the driven wheel 3 so as to provide a tension force for the grinding belt 4. Even if the grinding belt 4 becomes loose after it has been used for a period of time, the piston rod 61 of the cylinder 6 can push the driven wheel 3 to move by a distance in time so as to adjust the tension force of the grinding belt 4. In this way, the grinding belt 4 can be always kept in a tensioning state, so that the probability of abnormal conditions, such as slippage or falling-off of the grinding belt 4 can be reduced.

Further, when the grinding belt 4 is needed to be replaced, detachment of the grinding belt 4 can be easily performed by retracting the piston rod 61 of the cylinder 6 and hence driving the driven wheel 3 to move a distance such that the grinding belt 4 becomes loose. After a new grinding belt 4 is mounted, the cylinder 6 is actuated to push the driven wheel 3 to move, such that the mounted grinding belt 4 is supported to be in a tensioning state. Thus, installation of the grinding belt 4 can also be performed conveniently.

Furthermore, the rotation shaft 32 of the driven wheel 3 passes through the elongated hole 11 and then is connected with the sliding block 7, such that the sliding block 7 can provide a support for the driven wheel 3 and the acting force between the rotation shaft 32 of the driven wheel 3 and the inner wall of the elongated hole 11 is reduced. Thus, when the piston rod 61 of the cylinder 6 pushes the driven wheel 3 to move, cooperation between the sliding block 7 and the guiding member 8 provides a guiding function for movement of the driven wheel 3, so that the rotation shaft 32 of the driven wheel 3 can be protected from being worn and product reliability of the belt transmission device can be advantageously improved.

Alternatively, as shown in FIG. 6, the piston rod 61 of the cylinder 6 and the sliding block 7 may be connected with each other in such way that an end of the piston rod 61 of the cylinder 6 is connected with a pulling block 62, a stopping block 71 is provided on the surface of the sliding block 7 facing away from the grinding stand 1, and the pulling block 62 is connected with the stopping block 71. The end of the piston rod 61 of the cylinder 6 is connected with the pulling block 62 by a threaded connection or welding.

The acting force between the piston rod 61 of the cylinder 6 and the sliding block 7 mainly focuses on the pulling block 62 and the stopping block 71, and the main body of the sliding block 7 undergoes a small force. Thus, the main body of the sliding block 7 will not be damaged easily. Even if the pulling block 62 or the stopping block 71 are damaged during operation, only the pulling block 62 or the stopping block 71 is needed to be replaced, so that maintenance cost can be reduced.

More specifically, the pulling block 62 is in a dumb-bell shape that has two larger end portions and a smaller middle portion. The stopping block 71 is provided with a through groove extending in the retracting/stretching direction of the piston rod 61 of the cylinder 6. The middle portion of the pulling block 62 is engaged into the through groove, and the two end portions of the pulling block 62 are located at two sides of the stopping block 71, respectively.

Of course, it should be noted that other connection ways may be used to connect the piston rod 61 of the cylinder 6 and the sliding block 7, for example, to connect the piston rod 61 of the cylinder 6 and the sliding block 7 by welding. The details about the description thereof are omitted herein.

Alternatively, the cylinder 6 is provided with a second sensor (not shown in the figure). The second sensor is connected with the controller, and is configured to detect information on the stretching position of the piston rod 61 of the cylinder 6 in real time and to feed back the information on the stretching position to the controller. Before the controller controls rotation of the driver wheel 2, if the information on the stretching position fed back by the second sensor and received by the controller indicates that the piston rod 61 of the cylinder 6 does not normally stretch, the controller can send an alarm signal in time to warn the operator to deal with malfunction of the cylinder, so that the probability of delay, stop or the like of the apparatus caused by the malfunction of the cylinder 6 can be reduced, and utilization and productivity of the apparatus can be advantageously improved.

In an alternative embodiment, as shown in FIG. 3, the probe of the first sensor 5 faces toward the driven wheel 3 connected with the cylinder 6 to detect the rotation speed of the driven wheel 3. In this embodiment, the second sensor can also cooperate with the first sensor to detect whether the cylinder 6 is normally operated or not, so that the probability of delay, stop or the like of the apparatus caused by the malfunction of the cylinder 6 can be further reduced, and the utilization and productivity of the apparatus can be improved. For instance, when the second sensor detects that the piston rod 61 of the cylinder 6 has stretched out, and the first sensor 5 did not sense the driven wheel 3, it can be determined that the piston rod 61 of the cylinder 6 does not push the driven wheel 3 to an operation position, and thus the cylinder 6 operates abnormally and is needed to be repaired in time. As shown in FIG. 7, when the second sensor detects that the piston rod 61 of the cylinder 6 has been retracted, and the first sensor 5 still detected the driven wheel 3, it can be determined that connection between the piston rod 61 of the cylinder 6 and the sliding block 7 may loosen and is needed to be repaired by the operation personnel.

Alternatively, in the belt transmission device according to the present disclosure, the cylinder body of the cylinder 6 may be fixed to the grinding stand 1 or may be fixed to other members that are fixed with respect to the grinding stand 1 in the grinding apparatus.

In order to prolong service life of the cylinder 6 and to prevent impurity particles in external environment from influencing normal operation of the cylinder 6, a protection hood (not shown) may be provided outside the cylinder 6 in the present disclosure to provide sealing protection for the cylinder 6.

Embodiment 2

Next, the embodiment, in which the driver wheel 2 (not shown in the figure) is pushed by the piston rod 61 of the cylinder 6 to adjust the tension force of the grinding belt 4, is taken as an example to describe adjustment operation of the tension force of the grinding belt 4 in the belt transmission device according to the above embodiments of the present disclosure.

In the belt transmission device according to this embodiment of the present disclosure, the rotation shaft of the driver wheel 2 passes through the elongated hole and is mounted to the sliding block 7 provided on the grinding stand 1. The piston rod 61 of the cylinder 6 is connected with the sliding block 7. The piston rod 61 of the cylinder 6 pushes the driver wheel 2 to slide along the elongated hole by pushing the sliding block 7 to slide on the guiding member 8, so as to adjust the tension force of the grinding belt 4.

In the belt transmission device according to this embodiment, the piston rod 61 of the cylinder 6 always pushes the driver wheel 2 so as to provide a tension force for the grinding belt 4. Even if the grinding belt 4 becomes loose after it has been used for a period of time, the piston rod 61 of the cylinder 6 can push the driver wheel 2 to move by a distance in time so as to adjust the tension force of the grinding belt 4. In this way, the grinding belt 4 can be always kept in a tensioning state, so that the probability of abnormal conditions, such as slippage or falling-off of the grinding belt 4 can be reduced.

Alternatively, the piston rod 61 of the cylinder 6 and the sliding block 7 may be connected with each other in such way that an end of the piston rod 61 of the cylinder 6 is connected with a pulling block 62, a stopping block 71 is provided on the surface of the sliding block 7 facing away from the grinding stand 1, and the pulling block 62 is connected with the stopping block 71. The end of the piston rod 61 of the cylinder 6 is connected with the pulling block 62 by threaded connection or welding.

More specifically, the pulling block 62 is in a dumb-bell shape that has two larger end portions and a smaller middle portion. The stopping block 71 is provided with a through groove extending in the retracting/stretching direction of the piston rod 61 of the cylinder 6. The middle portion of the pulling block 62 is engaged into the through groove, and the two end portions of the pulling block 62 are located at two sides of the stopping block 71, respectively.

Of course, it should be noted that other connection ways may be used to connect the piston rod 61 of the cylinder 6 and the sliding block 7, for example, to connect the piston rod 61 of the cylinder 6 and the sliding block 7 by welding. The details about the description thereof are omitted herein.

Alternatively, the cylinder 6 is provided with a second sensor (not shown in the figure). The second sensor is connected with the controller, and is configured to detect information on the stretching position of the piston rod 61 of the cylinder 6 in real time and to feed back the information on the stretching position to the controller. Before the controller controls rotation of the driver wheel 2, if the information on the stretching position fed back by the second sensor and received by the controller indicates that the piston rod 61 of the cylinder 6 does not normally stretch, the controller can send an alarm signal in time to warn the operator to deal with malfunction of the cylinder, so that the probability of delay, stop or the like of the apparatus caused by the malfunction of the cylinder 6 can be reduced, and utilization and productivity of the apparatus can be advantageously further improved.

Alternatively, in the belt transmission device according to the present disclosure, the cylinder body of the cylinder may be fixed to the grinding stand 1 or may be fixed to other members that are fixed with respect to the grinding stand in the grinding apparatus.

In order to prolong service life of the cylinder 6 and to prevent impurity particles in external environment from influencing normal operation of the cylinder 6, a protection shroud may be provided outside the cylinder 6 in the present disclosure to provide sealing protection for the cylinder 6.

Further, the embodiments of the present disclosure further provide grinding apparatuses, comprising the belt transmission device according to any one of the above-mentioned technical solutions.

The belt transmission devices according to the embodiments of the present disclosure have the following advantages. In the grinding apparatus comprising the belt transmission device according to the embodiments of the present disclosure, when abnormal operations such as slippage or falling-off of the grinding belt occur, the controller can also make a response in time to warn the operator to deal with the problem, so that delay or stop of the grinding apparatus can be avoided, and the utilization and productivity of the grinding apparatus can be improved. At the same time, the product yield of the glass substrate ground by the grinding apparatus according to the embodiments of the present disclosure can be ensured.

In the description of the present disclosure, specific features, structures, material or characteristics can be combined in a proper way in any one or more embodiments or examples.

Although several exemplary embodiments have been shown and described, it would be appreciated by those skilled in the art that variations or modifications may be made in these embodiments without departing from the principles and spirit of the disclosure, the scope of which is defined in the claims and their equivalents.

What is claimed is:

1. A belt transmission device, comprising:
   a grinding stand;
   a plurality of rotation wheels mounted on the grinding stand, including a driver wheel and driven wheels;
   a grinding belt supported by the plurality of rotation wheels;
   a first sensor fixedly provided on the grinding stand and configured to detect a rotation speed of any one of the driven wheels; and
   a controller configured to control a rotation speed of the driver wheel and connected with a driving motor of the driver wheel,
   wherein the controller is further connected with the first sensor, receives rotation speed signals representing the rotation speed of the one driven wheel detected by the first sensor, calculates a difference between the rotation speed of the driver wheel and the rotation speed of the one driven wheel detected by the first sensor, compares the difference with a predetermined difference range in the controller, and initiates provision of an alarm when the difference is beyond the predetermined difference range.

2. The belt transmission device according to claim 1, wherein the first sensor is an eddy current displacement sensor, and a sensing structure is provided on a periphery of a side end face of the one driven wheel whose rotation speed is detected by the first sensor, and
   wherein the sensing structure is synchronously rotated along with the one driven wheel detected by the first sensor to form a rotation track, and a probe of the eddy current displacement sensor corresponds to a point on the rotation track.

3. The belt transmission device according to claim 2, wherein each driven wheel at least comprises one rotation roller and a hollow disk fixedly provided at an end of the rotation roller, a center axis of the hollow disk is coincident with a center axis of the rotation roller, an outer diameter of the hollow disk is greater than an outer diameter of the rotation roller, and a sensing structure is provided on the hollow disk.

4. The belt transmission device according to claim 3, wherein the sensing structure is a notch provided at an outer edge of the hollow disk.

5. The belt transmission device according to claim 3, wherein the sensing structure is a protrusion provided on a face of the hollow disk facing toward the grinding stand.

6. The belt transmission device according to claim 3, wherein the hollow disk is fixed to the end of the rotation roller near the grinding stand.

7. The belt transmission device according to claim 3, wherein the grinding stand is provided with an elongated hole having two ends in a semi-circular shape, and a rotation shaft of one of the plurality of rotation wheels is mounted to the grinding stand by passing through the elongated hole;
   wherein the grinding stand is provided thereon with a guiding member which is provided adjacent to the elongated hole and is provided on a surface of the grinding stand facing away from the plurality of rotation wheels, and the guiding member extends in a lengthwise direction of the elongated hole, and the guiding member is connected with a sliding block which is slidable on the guiding member, and the rotation shaft of the one of the plurality of rotation wheels corresponding to the elongated hole passes through the elongated hole and then is connected with the sliding block.

8. The belt transmission device according to claim 7, further comprising a cylinder, wherein a cylinder body of the cylinder is fixed with respect to the grinding stand, a piston rod of the cylinder is connected with the sliding block, and a retracting/stretching direction of the piston rod is parallel to the lengthwise direction of the elongated hole, and
   wherein the piston rod of the cylinder adjusts a tension force of the grinding belt by pushing the sliding block to slide and in turn pushing the rotation wheel connected with the sliding block to slide along the elongated hole.

9. The belt transmission device according to claim 8, wherein the guiding member includes two parallel guiding rails which are slidably connected with the sliding block.

10. The belt transmission device according to claim 8, wherein an end of the piston rod of the cylinder is connected with a pulling block, and a stopping block is provided on a surface of the sliding block facing away from the grinding stand, and the pulling block is connected with the stopping block.

11. The belt transmission device according to claim 10, wherein the pulling block is in a dumb-bell shape that has two larger end portions and a smaller middle portion, and the stopping block is provided with a through groove extending in the retracting/stretching direction of the piston rod of the cylinder, and wherein the middle portion of the pulling block is engaged into the through groove, and the two end portions of the pulling block are located at two sides of the stopping block, respectively.

12. The belt transmission device according to claim 8, wherein the cylinder is provided with a second sensor, and the second sensor is connected with the controller and is configured to detect information on a stretching position of the piston rod of the cylinder in real time and to feed the information on the stretching position back to the controller.

13. A grinding apparatus, comprising the belt transmission device according to claim 1.

14. The grinding apparatus according to claim 13, wherein the first sensor is an eddy current displacement sensor, and a sensing structure is provided on a periphery of a side end face of the one driven wheel whose rotation speed is detected by the first sensor, and wherein the sensing structure is synchronously rotated along with the one driven wheel detected by the first sensor to form a rotation track, and a probe of the eddy current displacement sensor corresponds to a point on the rotation track.

15. The grinding apparatus according to claim 14, wherein each driven wheel at least comprises one rotation roller and a hollow disk fixedly provided at an end of the rotation roller, and a center axis of the hollow disk is coincident with a center axis of the rotation roller, and an outer diameter of the hollow disk is greater than an outer diameter of the rotation roller, and a sensing structure is provided on the hollow disk.

16. The grinding apparatus according to claim 15, wherein the grinding stand is provided with an elongated hole having two ends in a semi-circular shape, and a rotation shaft of one of the plurality of rotation wheels is mounted to the grinding stand by passing through the elongated hole;

wherein the grinding stand is provided thereon with a guiding member which is provided adjacent to the elongated hole and is provided on a surface of the grinding stand facing away from the plurality of rotation wheels, and the guiding member extends in a lengthwise direction of the elongated hole, and the guiding member is connected with a sliding block which is slidable on the guiding member, and the rotation shaft of the one of the plurality of rotation wheels corresponding to the elongated hole passes through the elongated hole and then is connected with the sliding block.

17. The grinding apparatus according to claim 16, further comprising a cylinder, wherein a cylinder body of the cylinder is fixed with respect to the grinding stand, a piston rod of the cylinder is connected with the sliding block, and a retracting/stretching direction of the piston rod is parallel to the lengthwise direction of the elongated hole, and wherein the piston rod of the cylinder adjusts a tension force of the grinding belt by pushing the sliding block to slide and in turn pushing the rotation wheel connected with the sliding block to slide along the elongated hole.

18. The grinding apparatus according to claim 17, wherein an end of the piston rod of the cylinder is connected with a pulling block, and a stopping block is provided on a surface of the sliding block facing away from the grinding stand, and the pulling block is connected with the stopping block.

19. The grinding apparatus according to claim 18, wherein the pulling block is in a dumb-bell shape that has two larger end portions and a smaller middle portion, and the stopping block is provided with a through groove extending in the retracting/stretching direction of the piston rod of the cylinder, and wherein the middle portion of the pulling block is engaged into the through groove, and the two end portions of the pulling block are located at two sides of the stopping block, respectively.

20. The grinding apparatus according to claim 17, wherein the cylinder is provided with a second sensor, and the second sensor is connected with the controller and is configured to detect information on a stretching position of the piston rod of the cylinder in real time and to feed the information on the stretching position back to the controller.

* * * * *